Sept. 10, 1968  F. E. THOMPSON  3,401,333
COUPLED-LINE APPARATUS FOR MEASURING THE
THICKNESS OF THIN FILMS
Filed Aug. 25, 1965  5 Sheets-Sheet 5

United States Patent Office 3,401,333
Patented Sept. 10, 1968

3,401,333
COUPLED-LINE APPARATUS FOR MEASURING THE THICKNESS OF THIN FILMS
Fred Elmo Thompson, Gahanna, Ohio, assignor to Western Electric Company, Incorporated, New York, N.Y., a corporation of New York
Filed Aug. 25, 1965, Ser. No. 482,402
9 Claims. (Cl. 324—58.5)

ABSTRACT OF THE DISCLOSURE

The thickness of a sputtered conductive thin film on a substrate may be monitored during its deposition by employing, as the substrate support, a transmission line-type directional coupler coupled to the sputtering anode. The substrate is fixedly mounted in overlying relation to a coupling aperture in the common outer conductor of the coupler. As the thickness of the thin film builds up on the substrate during bombardment of the sputtering cathode, the coupling between the inner conductors of the coupler varies in proportion to the thickness of the thin film. The sputtering operation is terminated when a predetermined value of coupling is obtained.

---

This invention relates to methods of and apparatus for measurement of the characteristics of thin films and, more particularly, to methods of and apparatus for measuring the thickness of thin films deposited upon an electromagnetically transparent substrate.

Exploitation of the characteristics of thin films of metals or semiconductors (in which the observed properties differ markedly from those of the bulk material) has led to the development of essentially two-dimensional circuit elements. By the use of certain etching and bonding techniques, these thin-film elements (especially those utilizing tantalum and certain compounds thereof) can be interconnected with each other and with active semiconductive devices on a common substrate in order to form integrated circuitry. Utilizing this approach, designers have been able to combine the advantages of increased reliability and improved performance with those of reduced size, low cost and simplicity of assembly.

The deposition of a good film coating on a substrate is a key to the production of reliable devices and circuits of the above type. The control of film quality, in turn, is dependent at least in part upon the control of film thickness. To avoid the expense of processing bad film, and thereby expending labor on rejectable devices, every effort is made to monitor the film thickness (which has a marked bearing on its quality) as early as possible. Most advantageously, this initial determination should be made on a continuous basis during the process of deposition of the metal on the substrate. Moreover, it is desirable to do this without the necessity of breaking vacuum in the deposition chamber or of exposing the deposited film to the handling necessary when utilizing external measuring apparatus.

One accurate thickness measurement technique that is frequently used for thin films is described in Schwartz, N. and Brown, R., "A Stylus Method for Evaluating Thickness of Thin Films and Substrate Surface Roughness," Trans. Eighth Nat. Vac. Symp. AVC 11, 1961, pp. 836–845. In this method a sharp step equal to the film thickness is chemically formed between the substrate and the upper surface of the film after the finished film is removed from the coating chamber. The height of the step is then determined with the use of a sensitive stylus that is physically moved across the surface of the substrate. Unfortunately, this type of semidestructive measurement is detrimental to the further processing of the measured substrate for ultimate use in the manufacture of the circuit elements mentioned above.

Several nondestructive thickness measurement techniques have been evolved which do not utilize physical contact between the film and the measuring device. These techniques utilize, for example, interferometric measurements, tuning of coated quartz crystals, direct optical measurements, beta ray backscattering, and X-rays. While all such methods are generally satisfactory for laboratory use, they are not ideally adapted to monitor and measure thin films in production quantities during the deposition process.

The interferometric technique, like those employing physical contact, requires the removal of the substrate from the deposition chamber for purposes of measurement.

The wafers used in the quartz crystal tuning technique, in which the crystal frequency is varied in accordance with the thickness of a thin film deposited on at least one face of the crystal wafer, exhibit a considerable variation in frequency one to the other, and each crystal can only accommodate about 15 to 20 film depositions before it must be replaced. Moreover, because a coated quartz crystal manifests characteristics different from those of a coated substrate that is typically made of glass, the results of the crystal tuning technique is of only limited value as a gauge of film thickness variation on a substrate.

The direct optical measurement technique, which involves the determination of the amount of visible light that physically penetrates a sample of film material, is inadequate when used in connection with films whose thickness is relatively large compared with the wave length of the visible light source. This is the case, for instance, when metallic films suitable for thin-film capacitor manufacture are involved since the latter may have thicknesses in the vicinity of 5000 A.

Finally, the beta ray and X-ray techniques are expensive to instrument and, in addition, the radioactive phenomena necessarily involved have been found to interfere with the deposition process itself when utilized simultaneously therewith.

One object of the invention, therefore, is to provide new and improved methods of and apparatus for measurement of the characteristics of thin films.

Another object of the invention is to provide new and improved methods of and apparatus for measuring the thickness of thin films deposited upon an electromagnetically transparent substrate.

A further object of the invention is to provide an inexpensive, permanent and reliable apparatus for the rapid and continuous measurement of thin films as they are being deposited upon a substrate within a deposition chamber, such methods and apparatus having negligible detrimental effect upon the deposition process and the subsequent utility of the measured film.

A method illustrating certain features of the invention may includes the steps of mounting a substrate surface having the thin film thereon in fixed coupling proximity to a first and a second wave guiding path disposed in coupling relationship, and measuring the resultant variation in coupling between the first and second paths. Illustratively, the measurement of coupling may be made by applying an input signal to the first path and detecting the amount of the signal coupled from the first to the second path in the presence of the thin film.

Apparatus illustrating certain features of the invention may include first and second wave guide paths having a coupling region, and electromagnetically transparent means for supporting the thin film. The supporting means are mounted in fixed coupling proximity to the coupling region to vary the coupling between the first and second paths in accordance with the thickness of the thin film.

In a particular embodiment of such apparatus, the coupling paths may jointly comprise a directional coupler having first and second conductively separate, electromagnetically coupled inner conductors, and at least one common outer conductor conductively separate from the inner conductors. An apertured portion of the outer conductor is disposed in coupling proximity to and in overlaying relationship with the coupling region between the inner conductors. The directional coupler is adapted to receive a substrate surface to be coated in superimposed relationship over the apertured portion of the outer conductor and in coupling proximity thereto. Means may also be provided for varying the thickness of the thin film on the substrate surface, and, in the usual case where the measurement is made simultaneously with the deposition of the thin film in a deposition chamber, the film thickness varying means may comprise a coating cathode.

The nature of the present invention, the manner in which it accomplishes the above and related objects, and its various advantages and features, are more fully set forth in the following detailed description taken in connection with the appended drawing, in which:

FIG. 1 is a plan view, partly in block diagram form and with certain details omitted for purposes of clarity, of one embodiment of a coupled-path film thickness measuring device constructed in accordance with the invention and mounted within a deposition chamber, the device being shown in combination with equipment for measuring the variation in coupling between the paths as a function of thin film thickness;

Figure 1:
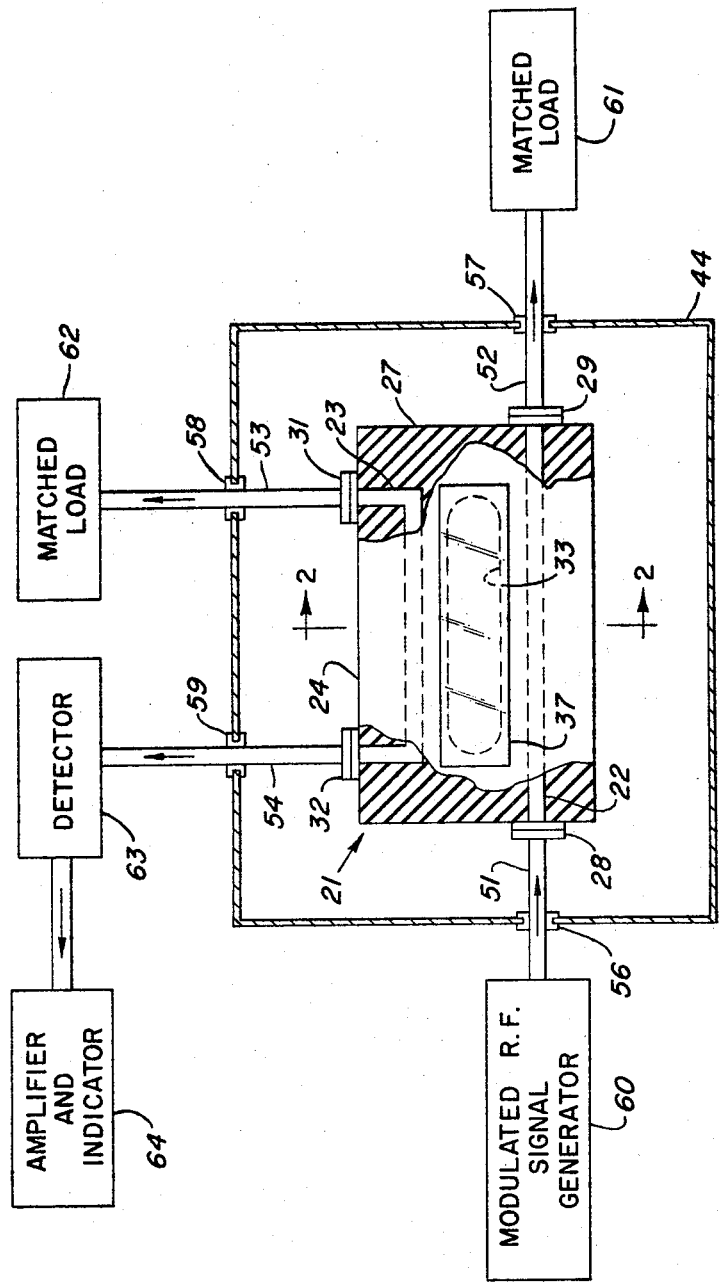
Figure 9:
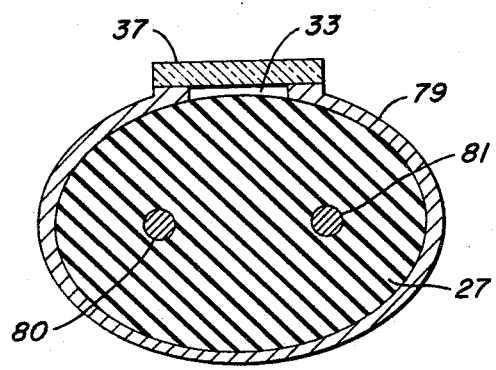
Figure 10:
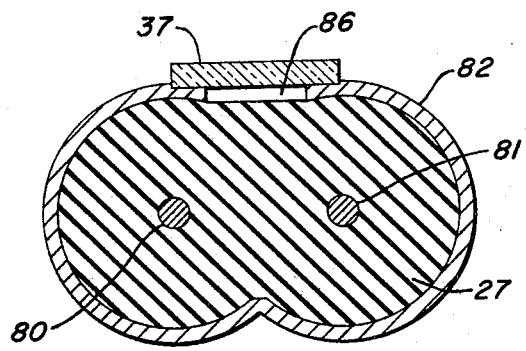

FIG. 9 is a view, taken in a plane corresponding to that of section 2—2 of FIG. 1, of a second alternative embodiment of a coupled-path film thickness measuring device suitable for use with the apparatus of FIG. 1; and FIG. 10 is a view, taken in a plane corresponding to that of section 2—2 of FIG. 1, of yet another alternative form of the coupled-path film thickness measuring device somewhat similar in principle to the device of FIG. 9.

For the purposes of the following description, a "transmission line-type" directional coupler is one having first and second conductively separate, electromagnetically coupled inner conductors and at least one common outer conductor conductively separate from the inner conductors. Moreover, the expression "coupling region" refers to the region surrounding the coupled inner conductors within which the electromagnetic field pattern established by an electrical signal in one inner conductor excites an electrical signal in the other inner conductor.

Figure 2:
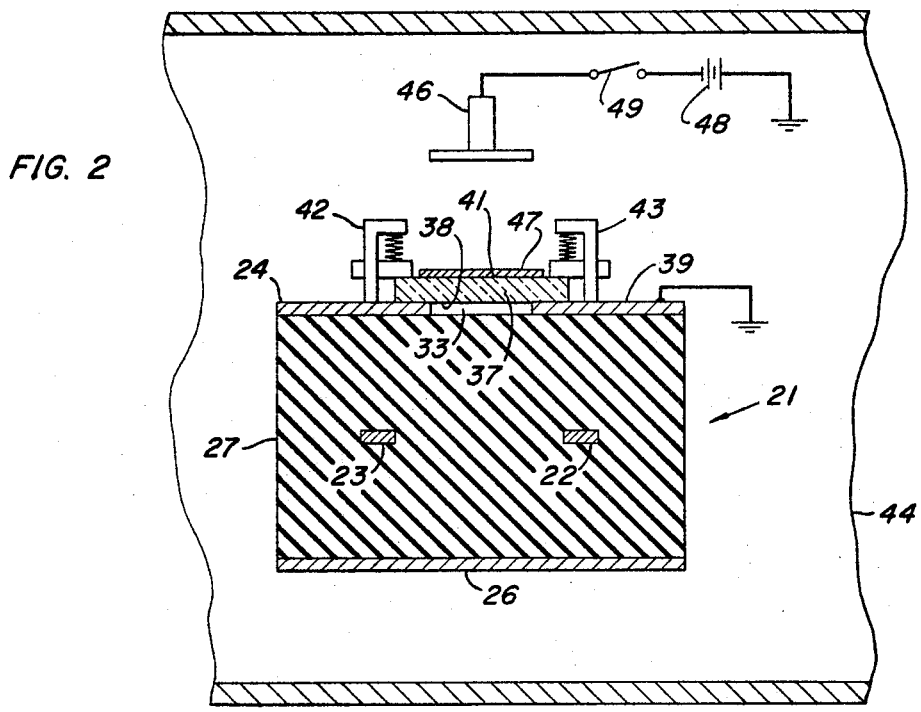
FIG. 2 is a view along section 2—2 of the coupled-path device of FIG. 1, including details omitted in FIG. 1.

FIG. 1 shows one form of thin-film thickness measuring apparatus in accordance with the invention. This apparatus includes a transmission line-type directional coupler 21 having a main transmission path inner conductor 22 and an auxiliary or coupled transmission path inner conductor 23. Conductors 22, 23 are disposed in parallel coupled relation over at least a portion of their lengths and, as shown more clearly in FIG. 2, comprise a pair of flat, coplanar, conductive strips spaced from each other and from a pair of planar outer conductors 24, 26 by an insulator 27. Outer conductors 24, 26 are disposed symmetrically on opposite sides of the plane of the inner conductors 22, 23 to form a symmetrical strip line directional coupler. For illustrative purposes, insulator 27 comprises a solid homogeneous block of polystyrene, although it will be understood that many other insulating materials and forms for supporting the inner conductors 22, 23 with respect to outer conductors 24, 26 will be suitable. As shown in FIG. 1, external access to the main transmission path is provided by coaxial adaptors 28, 29 and to the coupled transmission path by similar adaptors 31, 32. Adaptors 28, 29, 31 and 32 are readily available commercially and may be filled with solid insulating material to form vacuum seals for directional coupler 21.

Figure 3:
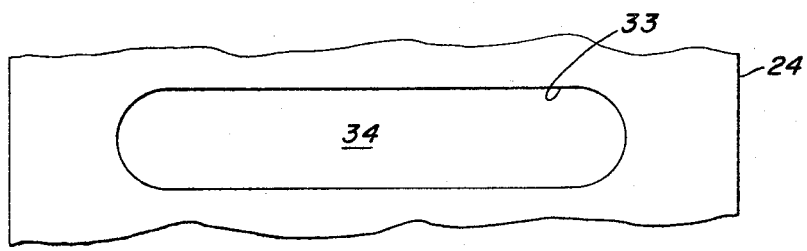
FIG. 3 is a plan view of one form of an apertured outer conductor of the coupled-path device of FIG. 1.

An apertured portion 33 is machined or otherwise formed in the part of outer conductor 24 that overlays the spacing between inner conductors 22, 23 in a manner similar to that described in U.S. Patent 3,094,677, issued to E. J. Theriot on June 18, 1963. As shown in FIG. 3, the apertured portion 33 comprises an elongated slot 34. The dimensions of the slot 34 are chosen to yield a desired amount of coupling between inner conductors 22, 23. The longitudinal axis of the slot 34 is preferably parallel to and coextensive with the parallel extent of conductors 22, 23.

The amount of electromagnetic energy coupled from the main path to the coupled path is determined by the characteristics of the coupling region, which in turn is dependent upon (a) the dielectric constant of insulator 27; (b) the longitudinal extent of the parallel portions of inner conductors 22, 23; (c) the proximity of adjacent edges of the inner conductors; and (d) the proximity to the inner conductors of apertured portion 33 in outer conductor 24. In a well designed directional coupler of this type, energy coupled from inner conductor 22 to inner conductor 23 is mainly manifested by a "backward" wave, i.e., an input signal introduced through adaptor 28 of the main path will be primarily coupled toward adaptor 32 of the coupled path and only a small fraction of the input signal will be coupled in the "forward" direction to appear at adaptor 31 of the coupled path. The ratio between the magnitudes of the backward and forward coupled waves, or a logarithmic function of that ratio, is commonly referred to as the directivity of the directional coupler.

Referring again to FIG. 2, a thin substrate 37, which for illustrative purposes is assumed to be made of lime glass but may be constructed of any solid rigid or flexible material that is relatively transparent to electromagnetic energy in the frequency range to be described below, is superimposed upon the apertured portion 33 of outer conductor 24. This superposition is preferably accomplished by mounting a surface 38 of the substrate 37 in contact with a surface 39 of outer conductor 24 over apertured portion 33. Since it is assumed that the substrate 37 is substantially transparent in the electromagnetic sense, this mounting arrangement assures that a surface 41 opposite surface 38 is disposed at all times in fixed coupling proximity to the coupling region of inner conductors 22, 23. For improved mechanical and electrical stability a plurality of spring loaded clamps 42, 43 may be brazed or otherwise affixed to outer conductor 24 on either side of the apertured portion 33 to secure the surface 41 in fixed relationship to apertured portion 33.

The directional coupler 21, together with substrate 37 affixed thereto, is positioned within a cathodic sputtering chamber 44 that is first evacuated and then partially filled with argon or other suitable working gas. A sputtering cathode 46 is disposed opposite surface 41 of substrate 37 for depositing a thin film 47 of tantalum thereon. The cathode 46 is coupled to a grounded source 48 of negative potential through a switch 49, and, advantageously, the outer conductor 24 is grounded so as to also serve as the anode of the deposition apparatus.

As shown in FIG. 1, adaptors 28, 29, 31 and 32 are respectively joined to a plurality of coaxial cables 51, 52, 53 and 54, which are readily available commercially and are preferably filled with vacuum-tight solid insulating material. Cables 51, 52, 53 and 54 are routed through outlets in the walls of the deposition chamber 44, and a plurality of vacuum seals 56, 57, 58 and 59 are disposed between the wall outlets of the chamber 44 and the outer jackets of the respective cables. A modulated RF signal generator 60 is connected to the output of cable 51. A pair of matched loads 61, 62 respectively terminate cables 52, 53. A detector 63 and a low frequency amplifier 64 sharply tuned to the modulation frequency are connected in tandem at the output of cable 54. The amplifier 64 is provided with a visual read-out indicator (not shown).

In order to utilize the apparatus of FIG. 1 to measure the thickness of thin film 47, the apparatus shown is first calibrated in the following manner. A substrate (not shown) without a thin-film coating thereon is affixed to directional coupler 21 in the manner indicated above. An input signal is then applied to cable 51 from RF generator 60. The proper choice of signal frequency, which is held constant throughout the calibration and measurement procedures, is dependent upon the material and thickness of the thin film 47. In order to assure an adequate coupling variation with changing film thickness, the input frequency should be chosen such that the "skin depth" of the thin film (i.e., the distance below the surface of the thin film at which the density of an electric current established therein is diminished to about one-third of its value at the surface of the film) is at least several times larger than the maximum film thickness to be measured. As is well known, the skin depth varies from material to material at any given frequency of operation and, for a given material, varies inversely as the square root of the frequency of operation. Thus the thin tantalum film 47, which has a skin depth of about 25,000 A. at 10,000 megacycles has a skin depth of 250,000 A. (25 microns) at 100 megacycles.

The portion of the input test signal that is coupled from inner conductor 22 to inner conductor 23 in the backward direction in the presence of the uncoated substrate is demodulated by detector 63. The demodulated signal is amplified by amplifier 64. A gain setting (not shown) of amplifier 65 is then adjusted to yield a convenient reference reading on the indicator thereof for the remainder of the calibration and thickness measuring procedure. The uncoupled portion of the input signal, and the portion of the input signal coupled to inner conductor 33 in the forward direction, are respectively dissipated in the matched loads 61, 62.

After the reference reading is obtained, the uncoated substrate is removed from directional coupler 21 and a plurality of reference substrates (not shown) respectively coated with tantalum films of different known thicknesses less than the skin depth are successively affixed to the directional coupler 21. The film thicknesses of the respective reference substrates are known because of prior measurements, as with the method described in the above-mentioned Schwartz et al. article or with any of the other non-destructive techniques indicated above.

After each reference substrate under test is in place, an input signal is applied to the main line of directional coupler 21 as indicated before. A portion of the resulting coupled field distribution between inner conductors 22 and 23 passes through both the apertured portion 33 and the reference substrate under test and penetrates through the film coating thereon to an effective reflecting plane whose location is dependent upon the film thickness. The plane location, in turn, affects the amount of coupling between the main and coupled lines and thus the indicator output reading of amplifier 64. Since each reference substrate yields a different reading proportional to the film thickness thereon, a calibration curve showing the variation in output reading with film thickness may be readily prepared. The accuracy of the calibration curve is proportional to the number of reference substrates tested.

After the calibration is accomplished, the substrate 37 to be coated in the sputtering chamber 44 is affixed to the directional coupler 21. The switch 49 (FIG. 2) is then closed to apply the negative voltage of source 48 between the cathode 46 and the grounded outer conductor 24, thereby initiating a glow discharge therebetween. The cathode 46, which is made from tantalum, is bombarded with ions of the working gas (not illustrated), and atoms of cathode material are ejected and sputtered substantially uniformly on surface 41 of substrate 37 to form the thin film 47. As the thin film thickness builds up on the surface 41 during the deposition process, the output reading of indicator 64 varies accordingly. By utilizing the calibration curve, the effective thickness of the film 47 can then be determined.

Since it has been assumed for illustrative purposes that a single substrate is to be coated and measured, switch 49 is advantageously opened to stop the deposition process when the desired thickness of film has been obtained. Where a plurality of identical substrates are successively advanced through the chamber 44 to be coated and measured, a feedback path (not shown) controlled by the output of detector 63 of the directional coupler 21 may be employed to maintain the film thickness at a desired level. This may be done, for example, by automatically controlling the speed of advance and thus the sputtering time for each substrate.

Figure 4:
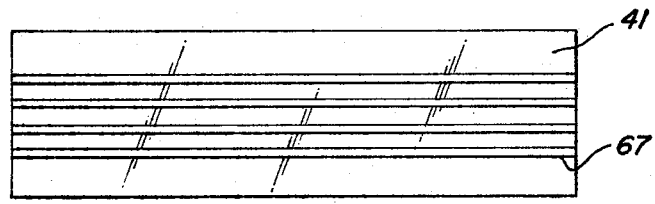
FIG. 4 is a plan view of one surface of a substrate suitable for use in the apparatus of FIG. 1, in which said surface is suitably masked during deposition so that the thin-film coating comprises a plurality of transversely spaced, elongated strips of the coated material.

Some increase in the useful range of coupling variation may be obtained by masking a portion of the surface 41 of substrate 37 during the deposition process to produce a plurality of parallel rows 66 (FIG. 4) of the thin film rather than a uniform distribution thereof.

Figure 5:
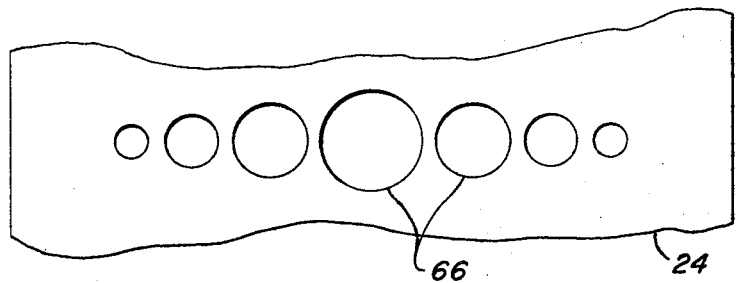
FIG. 5 is a plan view of an alternative form of an apertured outer conductor of the coupled-path device of FIG. 1.

It will be understood that while the film coating has been assumed to be deposited by a tantalum sputtering process, any other suitable coating means (such as evaporation or plating) as well as any other suitable coating metal or semiconductor material, may be employed. The elongated slot 34 which defines the apertured region 33 may also be replaced by an electrically equivalent structure such as a spaced array of coupling holes 67 (FIG. 5). Moreover, for certain test purposes substrate 37 may be made integral with directional coupler 21 by filling the aperture of apertured portion 33 with electromagnetically transparent material (not shown) suitable for supporting a thin film.

It should be noted that since the applied and coupled electrical signals are operative substantially within the confines of the modified directional coupler 21 and are routed into and out of the deposition chamber 44 by shielded coaxial cables, the thickness measuring function takes place without adversely affecting the deposition process within the chamber. Moreover, since such cables are advantageously filled with vacuum-tight solid insulating material, they may be connected or disconnected from the test equipment outside deposition chamber 44 without disturbing the vacuum within the chamber 44. In this regard, the necessity for at least two such external connections may be eliminated by physically mounting the matched loads 61, 62 within the chamber 44. It will also be appreciated that the necessity of a separate anode for the deposition apparatus is avoided by the arrangement described.

Figure 6:
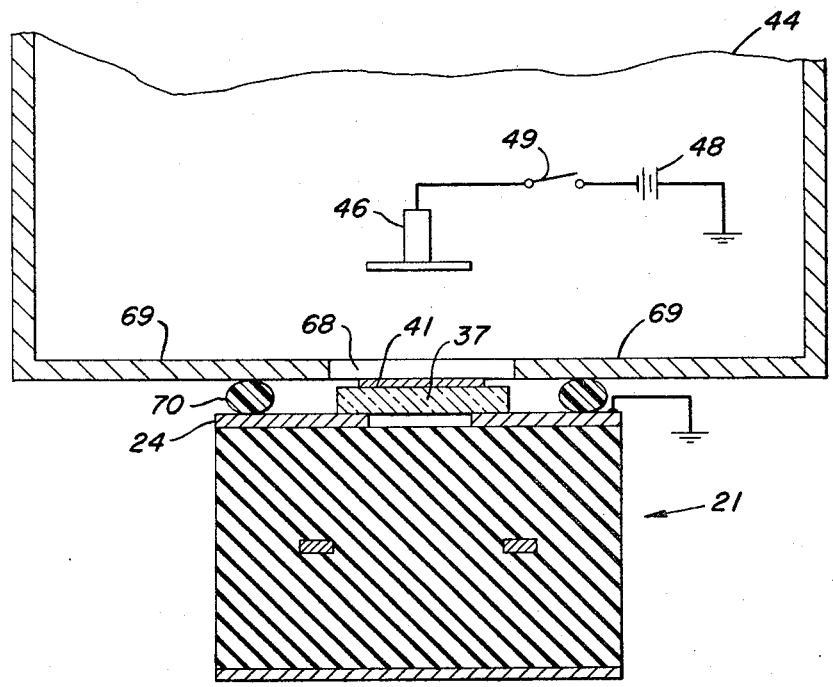
FIG. 6 is a view, taken in a plane corresponding to that of section 2—2 of FIG. 1, of a coupled-path device similar to that of FIG. 1, disposed outside and having a surface thereof in vacuum-tight contact with a wall of a thin-film deposition chamber.

FIG. 6 shows an alternative mounting arrangement for the directional coupler 21 with respect to the chamber 44. An opening 68 is disposed in a wall 69 of chamber 44 and is aligned with the cathode 46 within the chamber. The directional coupler 21 is mounted external to chamber 44 with the surface 41 of substrate 37 disposed adjacent opening 68 and aligned with cathode 46. A vacuum seal 70 such as an O-ring surrounds the substrate 37 and is compressed (by means not shown) between the outer conductor 24 and the wall 69 for forming a vacuum-tight seal between the directional coupler 21 and the chamber 44. Since the directional coupler 21 in this arrangement is mounted completely external to the chamber 44, the wall outlets for the cables 51, 52, 53 and 54 (FIG. 1) as well as the plurality of vacuum seals 56, 57, 58 and 59 may be dispensed with. Moreover, contamination within the chamber 44 is minimized since surface 41 of substrate 37 is the only surface of the thin-film measurement apparatus that is exposed to chamber 44. Also, since the opening in the wall 69 need only be large enough to expose the substrate 37 to the cathode 46, unwanted deposition of the thin film over the remainder of the directional coupler 21, and particularly over those portions of the outer conductor 24 adjacent the substrate 37, is minimized.

Figure 7:
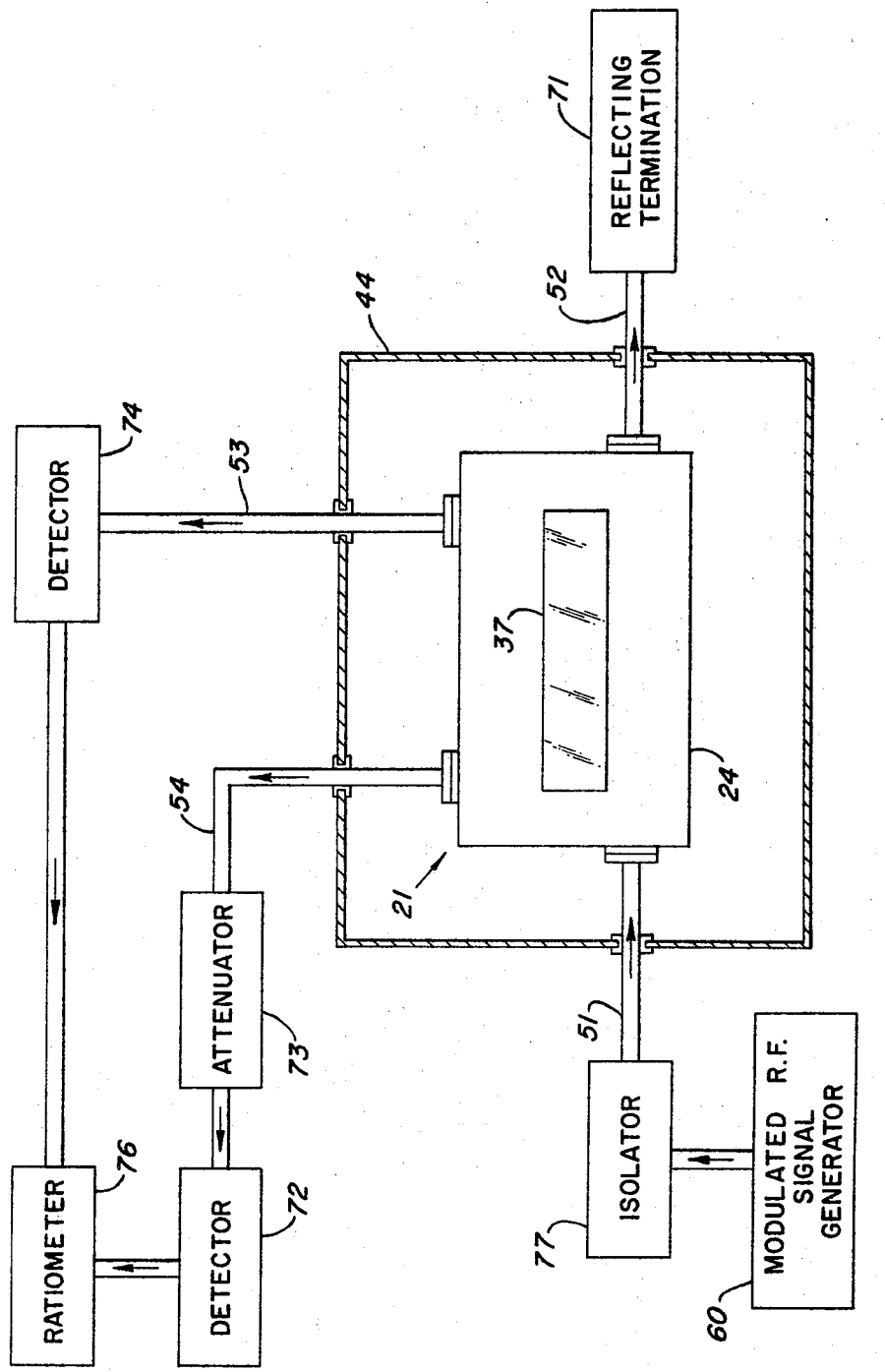
FIG. 7 is a plan view, partly in block diagram form and with certain details omitted for purposes of clarity, of the coupled-path device of FIG. 1, in combination with equipment for measuring the variation in directivity of the structure as a function of the thickness of a thin film being measured.

The measurement apparatus shown in FIG. 7 is a modification of that in FIG. 1 and is adapted to determine the variation in the ratio between the magnitudes of the forward and backward waves in directional coupler 21 with increasing film thickness. This arrangement is particularly useful since the variation in directivity of a directional coupler is generally greater than the variation of the backward wave alone. As in the apparatus of FIG. 1, an input signal in the frequency range described above is applied through cable 51 from RF generator 60 for both the calibration and operational procedures. In this case, however, cable 52 is terminated by a "perfect" reflector 71 (i.e., a short or open circuit) in order to reflect the input signal without substantially changing the magnitude thereof. A detector 72 is connected to cable 54 through an attenuator 73 and a detector 74 is connected directly to cable 53. The outputs of the respective detectors are routed to a ratiometer 76 which continually measures and displays the ratio of the output signals. Since the main path is terminated by a perfect reflector, a ferrite isolator 77 may be interposed between RF generator 60 and cable 51 in order to avoid frequency instability of the generator 60 caused by the mismatch between the reflector 71 and the remainder of the main line.

In order to establish a reference reading for the ratiometer 76 in the presence of an uncoated substrate similar to that described in connection with FIG. 1, attenuator 73 is chosen such that the relative power loss introduced thereby is made equal to the relative power loss coupled from the main line to the coupled line in the backward direction. As a result, the portion of the input signal from generator 60 that is coupled toward detector 72 is substantially equal to the portion of the reflected signal from reflector 71 that is coupled toward detector 74. The gain setting (not shown) of the ratiometer 76 is then adjusted to obtain a convenient reference reading. Once this reference reading is obtained, the calibration and operational procedures for the apparatus of FIG. 7 are identical to that discussed with reference to FIG. 1.

Figure 8:
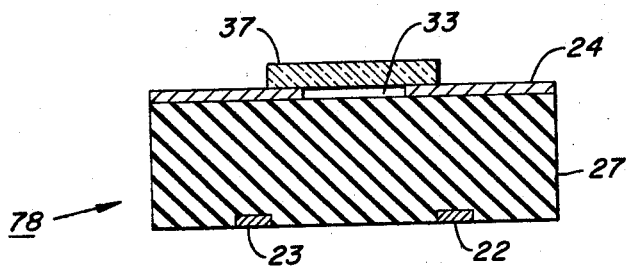
FIG. 8 is a view, taken in a plane corresponding to that of section 2—2 of FIG. 1, of a first alternative embodiment of a coupled-path film thickness measuring device suitable for use with the apparatus of FIG. 1.

As illustrated in FIGS. 8–10, other forms of directional couplers may be substituted for directional coupler 21 discussed with reference to FIGS. 1 and 7. FIG. 8, whose reference numerals correspond to those of FIG. 1, depicts a cross-sectional view (corresponding to that of FIG. 2) of an unsymmetrical (microstrip) strip line directional coupler 78 having an apertured portion 33 disposed in a single outer conductor 24 in the manner disclosed in U.S. Patent 2,951,218, issued to M. Arditi on Aug. 30, 1960.

The resulting coupler is adapted, as in FIG. 1, to receive the substrate 37 within its coupling region and is in all respects suitable for use in the measurement apparatus described in connection with FIG. 1 and FIG. 7.

Another suitable transmission line-type directional coupler is illustrated in cross-section in FIG. 9. A single outer conductor which is shown as a cylinder 79 of elliptical cross section, completely surrounds a pair of coupled inner conductors 80, 81, which are shown as conductive rods rather than flat strips. Alternatively, as shown in FIG. 10, the single outer conductor may comprise a housing 82 formed by the overlapping bores of a pair of tubular conductors 83, 84 in a manner similar to that described, e.g., in U.S. Patent 3,105,207, issued to Capewell et al. on Sept. 24, 1963. The conductors 83, 84, in turn, are respectively coaxial with inner conductors 80, 81. In order to adapt the device of FIG. 10 to receive a substrate within its coupling region, a longitudinal slot 86 is machined in the portion of the housing 82 overlaying the dielectric spacing between the inner conductors 80, 81. As is the case with the embodiment of FIG. 8, the arrangements of FIGS. 9 and 10 are in all respects suitable for use in the apparatus described in connection with FIG. 1 and FIG. 7.

It is to be understood that the above described embodiments of the invention are merely illustrative and that many modifications may be made within the scope and spirit of the invention. For example, although the exposed common outer conductor of a transmission line-type directional coupler renders the latter ideally suitable for receiving the substrate in a position that is accessible to both the coupling region and the sputtering cathode, it will occur to those skilled in the art that other types of coupled wave structures can be adapted for this purpose. Also, although the invention is particularly useful for measuring thin-film thickness during the deposition process itself, it may also be advantageously employed in measuring thin-film coatings of either fixed or variable thickness after the deposition process is completed.

I claim:

1. In a method of measuring the thickness of a conductive film, the steps of:
fixedly mounting a nonconductive substrate within the coupling region of a transmission line-type directional coupler having a main line and a coupled line and operable within a first frequency range;
depositing conductive material upon said substrate in the form of a thin film whose thickness is less than the skin depth of the film material at frequencies within the first frequency range to vary the coupling between the main line and the coupled line in proportion to the thickness of the film; and
measuring the variation in coupling between the main line and the coupled line during the deposition step.

2. A method of forming a thin film of predetermined thickness that is less than the skin depth of the film material at frequencies in a predetermined frequency range, comprising the steps of:
fixedly mounting a nonconductive substrate within the coupling region of a transmission line-type directional coupler having a main line and a coupled line;
depositing conductive material on said substrate to form the thin film and to vary the coupling between the main line and the coupled line in proportion to the thickness of the film on the substrate;
applying to the main line an input signal in said frequency range to induce, in the coupled line, first and second signals propagating in respectively opposite directions in the coupled line, the amplitude of the first signal being indicative of the thickness of the film;
detecting the amplitude of the first signal during the deposition step; and
terminating the deposition step when the amplitude of the first signal has reached a value corresponding to the predetermined thickness.

3. Method according to claim 2, comprising the further steps of:
detecting the amplitude of the second signal during the deposition step, and monitoring the ratio of the amplitudes of the first and second signals.

4. In a film deposition apparatus comprising a vacuum chamber that houses a substantially conductive film source and a substrate for receiving, from the source, a thin film coating whose thickness is less than the thickness of the source material at frequencies within a predetermined frequency band, the improvement which comprises:
a transmission line-type directional coupler disposed within the chamber opposite the source, the directional coupler comprising, in combination, first and second conductively separate, electromagnetically coupled inner conductors, and a common outer conductor overlying the inner conductors and having an apertured portion for altering the coupling between the inner conductors;
means for affixing the substrate to the outer conductor in overlying relation to the apertured portion to receive the coating from the source;
a first means fixedly coupled to the first inner conductor and communicating with the exterior of the vacuum chamber for applying to the first inner conductor an input signal having a frequency within the predetermined band; and
second means fixedly coupled to the second inner conductor and communicating with the exterior of the vacuum chamber for receiving signals induced in a prescribed one of two respectively opposite directions in the second inner conductor by the input signal in the first inner conductor.

5. Apparatus as defined in claim 4, in which the outer conductor comprises a housing having a pair of parallel overlapping bores extending therethrough, the walls of the bores comprising third and fourth conductors respectively disposed coaxially with and surrounding the first and second inner conductors, the apertured portion being formed in an overlapping region of the respective bore walls.

6. Apparatus as defined in claim 4, further comprising third means coupled to the second inner conductor and communicating with the exterior of the vacuum chamber for receiving signals induced in the second conductor in the other one of the two opposite directions by the input signal in the first inner conductor, and means for comparing the amplitudes of the signals induced in the respectively opposite directions in the second inner conductor.

7. Apparatus as defined in claim 4 in which the outer conductor is a ground plane, and the apertured portion is defined by an elongated slot in the ground plane.

8. Apparatus as defined in claim 4 in which the outer conductor is a ground plane, and the apertured portion is defined by an elongated array of coupling holes in the ground plane.

9. In a sputtering apparatus comprising a substantially conductive target connected to the sputtering cathode and a substrate for receiving a sputtered thin film from the target, the improvement which comprises:
a transmission line-type directional coupler disposed opposite the target, the coupler comprising a common outer conductor having an apertured portion;
means for affixing the substrate to the outer conductor in overlying relationship with the apertured portion to receive the sputtered film; and
means for conductively connecting the coupler to the sputtering anode of the apparatus.

References Cited

UNITED STATES PATENTS

| | | | |
|---|---|---|---|
| 2,866,167 | 12/1958 | Seidel | 333—84 |
| 2,951,218 | 8/1960 | Arditi | 333—84 |
| 3,094,677 | 6/1963 | Theriot | 333—10 |
| 3,102,232 | 8/1963 | Leonard et al. | 324—58.5 |
| 3,105,207 | 9/1963 | Capewell et al. | 333—97 X |
| 3,136,946 | 6/1964 | Le Vine | 324—58.5 |

OTHER REFERENCES

Bell Laboratories Record, vol. XXVIII, No. 10, October 1950, pp. 433–437.

RUDOLPH V. ROLINEC, *Primary Examiner.*

P. F. WILLE, *Assistant Examiner.*